United States Patent [19]

Kan et al.

[11] Patent Number: 4,914,291

[45] Date of Patent: Apr. 3, 1990

[54] GIMBAL ANGLE DETECTOR

[75] Inventors: Philip T. Kan; William R. Yueh, both of Fullerton, Calif.

[73] Assignee: General Dynamics Corporation, Pomona Div., Pomona, Calif.

[21] Appl. No.: 188,580

[22] Filed: Apr. 29, 1988

[51] Int. Cl.$^4$ .............................. G01D 5/34
[52] U.S. Cl. .................. 250/231.12; 33/318; 74/5.6 A; 250/227.29
[58] Field of Search ........... 250/231 GY, 227, 203 R, 250/236; 74/5.6 A, 5.8, 5.9; 33/318, 323

[56] References Cited

U.S. PATENT DOCUMENTS

| | | | |
|---|---|---|---|
| 3,277,304 | 10/1966 | Vyce | 250/231 GY |
| 3,283,409 | 11/1966 | Rothe et al. | 250/231 GY |
| 3,325,594 | 6/1967 | Goldhammer et al. | 178/7.6 |
| 3,328,595 | 6/1967 | Todd, Jr. | 250/231 |
| 3,422,686 | 1/1969 | Unruh | 74/5.6 |
| 3,499,332 | 9/1968 | Fingerett et al. | 74/5.6 |
| 3,592,066 | 7/1971 | Speen | 74/5.6 A |
| 3,732,739 | 5/1973 | Catford et al. | 74/5.6 A |
| 3,733,133 | 5/1973 | Chapman | 356/152 |
| 3,907,431 | 9/1975 | McDougal | 356/152 |
| 4,131,248 | 12/1978 | Bergiund | 244/316 |
| 4,361,760 | 11/1982 | Rodgers | 250/231 |
| 4,371,784 | 2/1983 | Rodgers | 250/231 |
| 4,381,448 | 4/1983 | Rodgers | 250/227 |
| 4,404,592 | 9/1983 | Pepin et al. | 358/125 |
| 4,420,258 | 12/1983 | Burns et al. | 356/350 |
| 4,420,259 | 12/1983 | Taylor | 356/350 |
| 4,437,243 | 3/1984 | Brown | 74/5.6 A |
| 4,610,172 | 9/1986 | Mickle et al. | 74/5.6 A |

Primary Examiner—David C. Nelms
Assistant Examiner—Michael Messinger
Attorney, Agent, or Firm—Neil F. Martin; Leo R. Carroll

[57] ABSTRACT

An apparatus for detecting deflection of the spin axis of a gimbal supported spinning mass relative to the gimbal axis comprises four equally spaced linear arrays of detector elements mounted around the gimbal axis and extending parallel to that axis. Four light sources are provided, each one in alignment with a respective one of the arrays, and a reflective surface is provided on the spinning mass for reflecting light onto the respective detector arrays. Deflection of the spin axis will be registered by displacement of a reflected light spot in one or more of the arrays.

6 Claims, 2 Drawing Sheets

GIMBAL ANGLE DETECTOR

BACKGROUND OF THE INVENTION

The present invention relates to an apparatus for detecting deflection of the spin axis of a gimbal supported spinning mass relative to the gimbal axis. The apparatus is suitable for use in gyroscopic instruments and is particularly intended for use in inertial navigation systems such as are found in missiles, aircraft, satellites and other steered devices.

Gimbal supported spinning mass gyroscopes are commonly used in inertial navigation systems for maintaining a fixed orientation in space or tracking a predetermined path. Thus a gyroscope is commonly deployed in missile guidance systems for terminal homing. The gyroscope comprises a spinning magnet rotatably mounted on inner and outer gimbals for azimuthal and elevational displacement of the spin axis. Thus any deflection of the spin axis will normally have two components, azimuth and elevation, and a suitable detector arrangement must be provided to detect the two components of deflection. Control signals corresponding to deflections of the spin axis are used in the missile guidance system which controls the orientation of the missile. The detected signals must therefore be very accurate for correct terminal homing.

In the past an induction coil method has been used to measure the angle of the spinning magnet. This method is subject to excessive fluctuations, nonlinearity, and other inaccuracies which significantly limit the angle resolution. Better angle resolution than can be produced with this method is desirable for accurate compensation of the gyroscope drift and for correct terminal homing.

Various optical systems for detecting spin axis deviations of gimbal rotors in gyroscopic instruments have been devised in the past. Such systems involve light reflectors for reflecting light incident on the rotor onto suitable detectors for providing an indication of spin axis deviations. These systems are typically relatively complex and require special mounting assemblies in the gimbal housing.

One such system is shown in U.S. Pat. No. 3,422,686 of Unruh, where deviations of a gimbal rotor spin axis are detected by reflecting light off a mirrored surface in the system through various reflective surfaces and apertures onto photo detectors. The optical system is relatively complex and is arranged such that when the spin axis of the rotor is correctly aligned, an annular image is traced on the detector which is concentric with a circular aperture through which light is reflected onto the detector.

In U.S. Pat. No. 3,499,332 of Fingerett, et al. a gyroscope having a spherical rotor is provided with four light sensors supported on the inner gimbal surrounding a light source. A mirrored surface on the rotor reflects light onto the sensors which respond to X and Y axis deviations of the rotor axis.

In U.S. Pat. No. 4,361,760 of Rodgers the gimbal rotor of a gyroscope is provided with a special reflective non-reflective pattern to reflect light onto two fiber optic sensors mounted concentrically on the outer gimbal shaft.

SUMMARY OF THE INVENTION

According to the present invention an apparatus for detecting deflection of the spin axis of a gimbal mounted spinning mass comprises four linear arrays of radiant energy detectors equally spaced around and parallel to the gimbal axis and four radiant energy sources, each of which is aligned with a respective one of the detector arrays. The spinning mass is provided with a reflective surface or surfaces for reflecting radiant energy from the sources onto the respective arrays.

The arrays preferably comprise arrays of fiber optic elements and a suitable light source is aligned with each array. When the spin axis is aligned with the gimbal axis, light from each source will be reflected onto a predetermined position on the respective arrays.

Since deviations of the spin axis will normally have two components, one for elevational tilt and one for azimuthal tilt of the spinning mass, one pair of the arrays is arranged to detect deviations about the first axis of rotation, or X-axis, of the gimbal assembly and the other pair of arrays will detect deviations about the second axis of rotation, or Y-axis, of the gimbal assembly. When the spin axis rotates relative to the gimbal axes the spot reflected on one or more of the arrays will move, with the displacement of the spot indicating the angle of deflection. A vector addition of the displacement of the spot in one of the X-axis arrays and one of the Y-axis arrays will give the overall angular deflection of the spin axis in the elevational and azimuthal planes.

This arrangement is relatively simple and provides relatively good angle resolution.

It is therefore an advantage of this invention that gimbal angle detector is provided which is relatively simple and easy to mount.

It is a further advantage of this invention that a relatively good angle resolution and large angle coverage is provided.

BRIEF DESCRIPTION OF THE DRAWINGS

The above and other objects and advantages of this invention will be more apparent from the following description of a preferred embodiment together with the accompanying drawings, in which like reference numerals refer to like parts and in which.

DESCRIPTION OF THE PREFERRED EMBODIMENTS

The drawings show a preferred embodiment of a gimbal angle detector system according to the invention which is shown mounted on the gimbal hub 11 of a gyroscope system 12 in a typical missile seeker head 14. However, it will be appreciated that the gimbal angle detector of this invention has many alternative applications and may be used in any gyroscopic instrument for detecting inclination of the spin axis.

Figure 1:
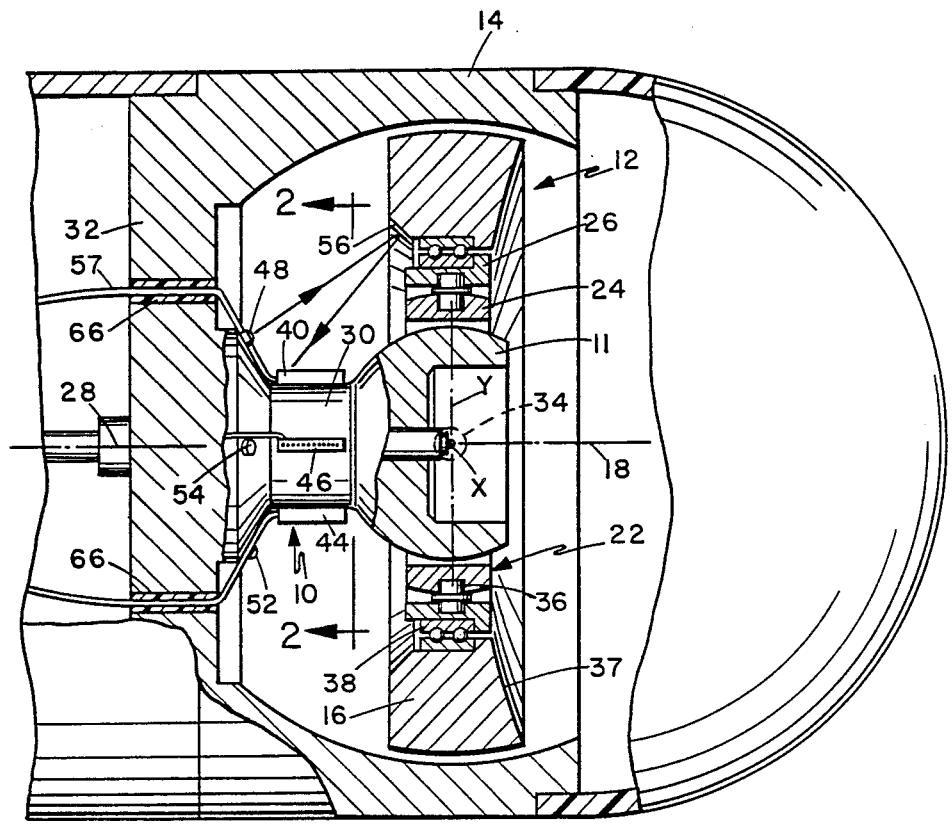
FIG. 1 is a cut away side elevation view of a missile seeker head having a gyroscope system incorporating a gimbal angle detector according to a preferred embodiment of the present invention.
Figure 2:
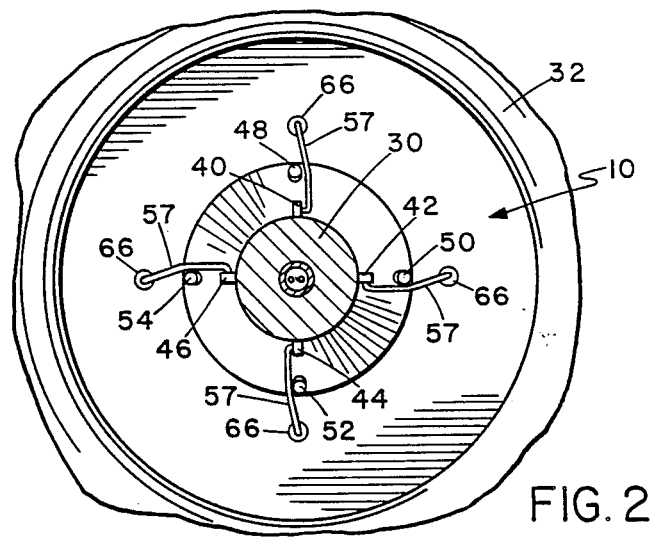
FIG. 2 is a sectional view on the lines 2—2 of FIG. 1.

In the system 12 illustrated in FIG. 1, a spinning magnet 16 having a spin axis 18 is rotatably mounted on a gimbal assembly 22. The gimbal assembly is mounted on the gimbal hub 11 and comprises an inner gimbal ring 24 mounted to rotate about a first axis X and an outer gimbal ring 26 mounted to rotate about a second axis Y perpendicular to the first axis and to the hub gimbal axis 28. The hub 11 is mounted via shaft 30 defining the gimbal axis 28 on a mounting bulkhead 32 of the missile seeker head 14 (or other body for containing a gyroscopic instrument). The inner gimbal ring 24 is mounted via a first set of gimbal bearings 34 for rotation on the gimbal hub, and the outer gimbal ring 26 is pivoted about gimbal bearings 36 on the inner ring 24.

The spinning magnet 16 carries the primary mirror 37 of the seeker head and is rotatably mounted on the outer ring 26 via the gyro spin bearings 38. Thus the magnet 16 can spin about its central axis, or spin axis, and can also tilt about the two gyro axes. The driving and deflection coils are omitted for simplicity.

The gyroscope system forms part of the missile homing mechanism for directional control of the missile. The gimbal angle detector provides signals representing the deviation of the spin axis 18 from the gimbal axis 28 in the X and Y (or elevation and azimuth) directions. These signals are used to provide steering signals to the missile homing and guidance mechanism. The gimbal axis 28 in this particular embodiment coincides with the longitudinal axis of the missile.

The gimbal angle detector 10 basically comprises four equally spaced linear arrays 40, 42, 44, 46 of light detecting elements mounted around and parallel to the gimbal axis, and four light sources 48, 50, 52, 54 each aligned with a respective one of the arrays 40, 42, 44, 46. A reflective surface 56 on the back of the spinning magnet is arranged to reflect light from the light sources onto the respective arrays.

In the preferred embodiment of the invention the detector arrays are coherent linear arrays of fiber optic elements. Any suitable light sources may be used, for example light emitting diodes, fiber optic tips, or the like.

It will be appreciated that alternative arrangements are possible and that any suitable radiation sources and linear detector arrays may be used.

Figure 3:
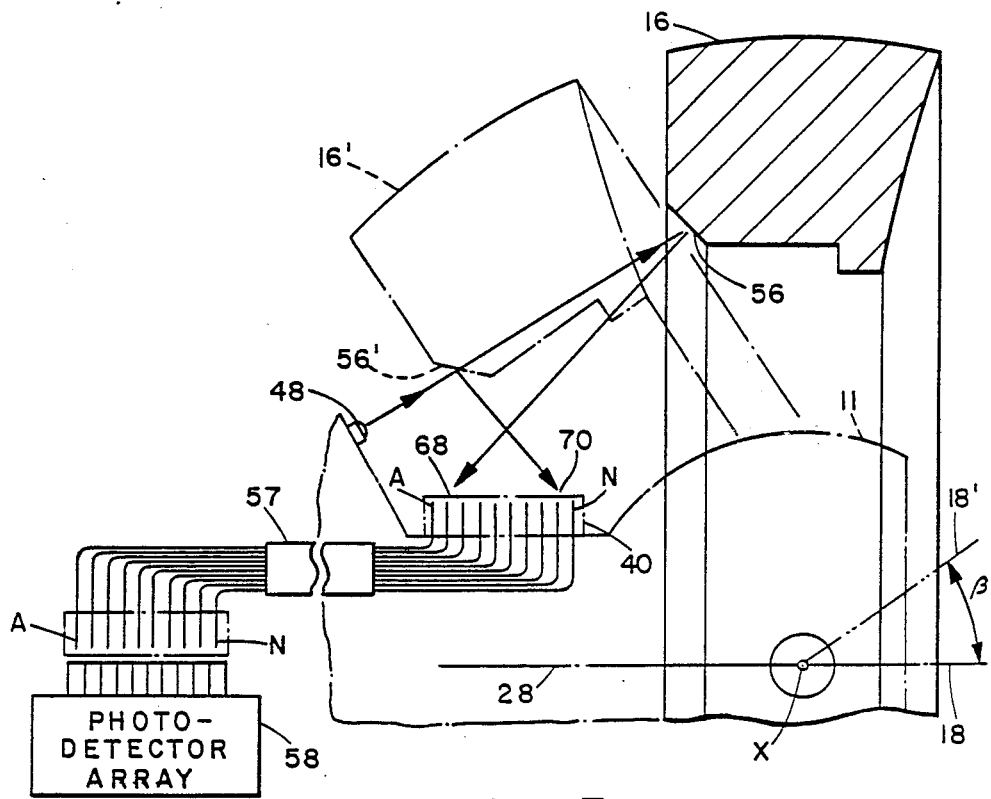
FIG. 3 illustrates schematically the optical function of a single photodetector circuit.

The reflective surface 56 is suitably a bevelled flat forming an annular strip around the back face of the magnet as illustrated in FIGS. 1 and 3.

Each light source and associated array is mounted along the gimbal axis as shown in FIG. 1. The fiber optic arrays are mounted on the gimbal shaft 30, and in preferred embodiment the arrays each comprised a 300 element 25 micron fiber optic array of less than 0.030 inch diameter and about 0.3 inches in length.

The fiber bundles pass in surrounding sleeves 57 out of the gimbal housing into a remote processing compartment where they are connected to four photodetector arrays 58, 60, 62, 64, as illustrated schematically in FIG. 3. Four equidistant openings 66 are drilled through the mounting bulkhead for passage of the sleeve enclosed fiber bundles out of the housing, as shown in FIG. 1, and the spacings around the bundles are sealed with a suitable sealent material.

When the spin axis 18 coincides with the gimbal axis 28 as shown in FIG. 3, light will be reflected equally from each light source onto a spot 68 on the associated fiber optic array. Considering just one array 40 and light source 48, if the spinning magnet tilts to the broken line position 16' shown in FIG. 3, the reflected spot will move to a new position 70 and the distance moved will correspond to the angle B through which the spin axis 18' has rotated. As shown in FIG. 3, each of the elements A through N of the array are associated with corresponding photodetector elements A through N, respectively, of photodetector array 58. Similar connections are provided from the other fiber optic arrays to the associated photodetector elements.

Rotation of the spin axis will normally have an X and Y axis component corresponding to the two degrees of freedom of the gyroscope. The arrangement of four equally spaced linear detector arrays and associated aligned light sources enables opposite arrays 40, 44 to detect deviations in the X, or elevational, direction and the other two opposed arrays 42, 46 to detect deviations in the Y, or azimuth direction. The X and Y components of the angle deviation are then vectorially summed to indicate the overall displacement angle.

Figure 4:
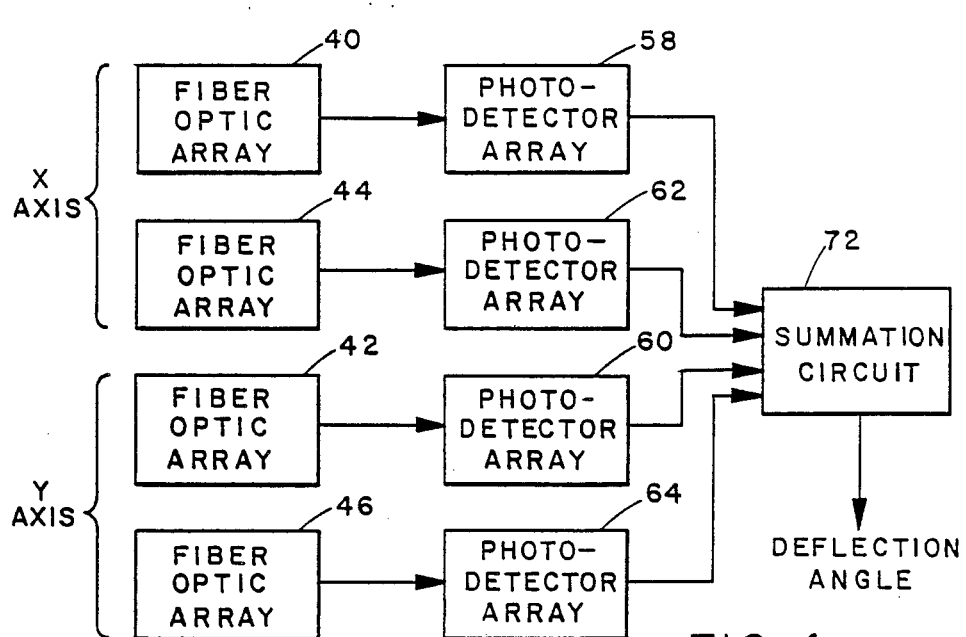
FIG. 4 is a block diagram of the basic signal processing system.

Thus in a normal displacement of the spinning magnet out of the plane perpendicular to the gimbal axis, the light spot reflected on at least two adjacent arrays will be displaced. This will be detected by the corresponding detectors in the detector arrays and suitable navigational control signals will be produced in a summation circuit 72 in the normal manner in the processing compartment, as illustrated schematically in FIG. 4.

The smallest resolvable displacement angle is determined by the spacing of the fiber optic array elements and the smallest possible optical path length from the light source to the reflective surface and back to the detector array. For example, given an interelement spacing d of 25 microns and a minimum path length l of 0.375 inches (0.95 cm), the angle resolution is d/l or 2.7 mr. If the total length of the array is 0.3 inches (0.762 cm), the angle coverage will be of the order of 45 degrees.

The detector arrangement of this invention therefore gives a good look angle resolution in order to compensate accurately for gyroscope drift, and is sufficiently accurate for use in missile housing systems where an angle resolution of the order of 4 mr. is desirable. The angle coverage can be of the order of 45 degrees, which is also desirable for missile homing systems.

Although the detector apparatus is particularly suitable for missile homing systems, it may be used in any gyroscopic instrument for accurate detection of spin axis deviation from the gimbal axis.

Although a preferred embodiment of the invention has been described above by way of example, it will be understood by those skilled in the field that modifications may be made to the disclosed embodiments which are within the scope of the invention as defined by the appended claims.

We claim:

1. Apparatus for detecting deflection of the spin axis of a gimbal shaft supported spinning mass relative to the gimbal axis, comprising:

a gimbal shaft supported spinning mass;

a total of four equally spaced linear arrays of radiation receiving elements mounted on said gimbal shaft to extend parallel to the gimbal axis of said gimbal at 90 degree intervals, each array consisting of a single line of spaced elements;

a total of four radiation sources, each mounted in alignment with a respective one of said arrays; and a reflective surface on said spinning mass for reflecting radiation from said sources onto respective aligned ones of said arrays according to the deflection of the spin axis of said spinning mass, whereby deflection of the spin axis from the gimbal axis will be registered by displacement of the detected radiation in at least one of said arrays.

2. Apparatus as claimed in claim 1, wherein the receiving elements comprise coherent linear arrays of fiber optic elements and the radiation sources each comprise a light source for directing a point of light from the reflective surface onto a respective aligned one of said arrays.

3. Apparatus as claimed in claim 2, wherein each fiber optic array comprises a 300 element array with a 25 micron inter-element spacing.

4. Apparatus as claimed in claim 2, including four photodetector arrays, each one connected to a respective one of said fiber optic arrays; and processing means for receiving signals from said coherent linear arrays and producing an output signal corresponding to a combined X and Y axis deflection of said spin axis.

5. The apparatus as claimed in claim 1, wherein there are only four lines of receiving elements and four aligned radiation sources.

6. A gyroscopic apparatus, comprising:
- a gimbal shaft;
- a rotor rotatably supported on said gimbal shaft, the rotor having an annularly extending reflective surface facing towards said gimbal shaft;
- at least four equally spaced linear arrays of radiation receiving elements mounted on said gimbal shaft at 90 degree intervals, each array comprising a single line of spaced receiving elements extending parallel to the axis of said gimbal shaft; and
- at least four radiation sources, each mounted in alignment with a respective one of said arrays for directing radiation from the reflective surface onto the respective aligned array.

* * * * *